(12) United States Patent
Cao et al.

(10) Patent No.: US 8,559,744 B2
(45) Date of Patent: Oct. 15, 2013

(54) METHOD FOR PROCESSING A DIGITAL OBJECT AND RELATED SYSTEM

(75) Inventors: Frédéric Cao, Boulogne-billancourt (FR); Frédéric Guichard, Boulogne-billancourt (FR); Noura Azzabou, Boulogne-billancourt (FR); Jean-Michel Morel, Cachan Cedex (FR); Antoni Buades, Palma De Mallorca-Espagne (ES); Bartomeu Coll, Palma De Mallorca-Espagne (ES)

(73) Assignee: DXO Labs (FR)

( * ) Notice: Subject to any disclaimer, the term of this patent is extended or adjusted under 35 U.S.C. 154(b) by 583 days.

(21) Appl. No.: 12/672,497

(22) PCT Filed: Aug. 7, 2008

(86) PCT No.: PCT/FR2008/051471
§ 371 (c)(1),
(2), (4) Date: Jan. 11, 2011

(87) PCT Pub. No.: WO2009/022083
PCT Pub. Date: Feb. 19, 2009

(65) Prior Publication Data
US 2011/0097008 A1 Apr. 28, 2011

(30) Foreign Application Priority Data
Aug. 7, 2007 (FR) ...................... 07 05754

(51) Int. Cl.
*G06K 9/40* (2006.01)
*G06K 9/38* (2006.01)
*H04N 1/407* (2006.01)

(52) U.S. Cl.
USPC ........................... 382/260; 382/275; 358/3.26

(58) Field of Classification Search
USPC .......... 382/274–275, 276, 260–269; 375/254; 358/3.26, 3.27, 516; 345/611, 647
See application file for complete search history.

(56) References Cited

U.S. PATENT DOCUMENTS 5,736,857 A 4/1998 Taft
6,373,992 B1 4/2002 Nagao
(Continued)

FOREIGN PATENT DOCUMENTS

EP 1413986 A2 4/2004
GB 2390772 A 1/2004

OTHER PUBLICATIONS

Buades et al., "A Review of Image Denoising Algorithms, With a New One," Multiscale Model. Simul. 4(2): 490-530, 2005.

(Continued)

*Primary Examiner* — Kanjibhai Patel
(74) *Attorney, Agent, or Firm* — Dean W. Russell; Kilpartick Townsend & Stockton LLP

(57) ABSTRACT

The invention relates to the processing of a digital object that comprises: cancelling the noise of an original object (I) of a first type containing noise in order to obtain a noise-free object (J) of the first type; obtaining an object with a quasi-white noise of the first type from a difference (B) between the original object and the noise-free object; applying to the noise-free object (J) a first processing (t1) that comprises a neighboring processing for obtaining a transformed object (K) of a second type, the first processing being such that it would structure the noise contained in the original object if it was applied to said original object; applying to the noise object a second white processing (t2) for obtaining a quasi-white transformed noise object (C) of the second type; and inserting into the transformed object (K) the transformed noise object.

14 Claims, 4 Drawing Sheets

(56) References Cited

U.S. PATENT DOCUMENTS

| | | | |
|---|---|---|---|
| 6,937,775 B2 | 8/2005 | Gindele et al. | |
| 7,027,661 B2 * | 4/2006 | Estevez et al. | 382/275 |
| 7,102,352 B2 * | 9/2006 | Hinks et al. | 324/318 |
| 7,120,308 B2 * | 10/2006 | Guleryuz | 382/254 |
| 8,218,083 B2 * | 7/2012 | Asamura et al. | 348/620 |
| 2001/0052907 A1 | 12/2001 | Mukai et al. | |
| 2003/0174223 A1 | 9/2003 | Hayashi | |
| 2003/0215153 A1 | 11/2003 | Gindele et al. | |
| 2006/0029285 A1 | 2/2006 | Hein et al. | |

OTHER PUBLICATIONS

Buzzi et al., "Uniqueness of Blur Measure," ICIP International Conference on Image Processing, vol. 5: 2985-2988, Oct. 24-27, 2004.

Kim et al., "Noise insensitive high resolution color interpolation scheme considering cross-channel correlation," Optical Engineering 44(12): 127006-1-127006-15, Dec. 2005.

Lee, "Note: Digital Image Smoothing and the Sigma Filter," Computer Vision, Graphics, and Image Processiong 24: 255-269, 1983.

Smith et al., "Susan—A New Approach to Low Level Image Processing," Int. J. Computer Vision 23(1): 45-78, 1997.

Tomasi et al., "Bilateral Filtering for Gray and Color Images," ICCV Proceedings of the Sixth International Conference on Computer Vision, IEEE Computer Society: 839-846, 1998.

International Search Report, mailed Mar. 20, 2009, for PCT/FR2008/051471, 5 pages.

* cited by examiner

METHOD FOR PROCESSING A DIGITAL OBJECT AND RELATED SYSTEM

BACKGROUND OF THE INVENTION

The present invention concerns the processing of a digital object.

A digital object consists of elements, that is to say elementary items of information. It may be of various natures. It may for example be a bidimensional image in the case of digital photography in particular. In this case, the elements constituting such an image are pixels (standing for "picture elements").

In a variant, the object may be a sequence of bidimensional images, which can also be seen as a three-dimensional image (two spatial dimensions and one time dimension). This is the case for example in certain medical applications or for films. The elements constituting such an object are for example the pixels of an image in the sequence of images.

The digital object in question may also possess four dimensions, as is the case for films where each image is three dimensional for example.

According to another example, the digital object could comprise a sound, the constituent elements of which are for example intensities, or a modulated signal the constituent elements of which may correspond to intensities and/or phases.

More generally, a digital object has one or more dimensions among the following dimensions: spatial (for example a distance, an angle or a travel in a mesh), temporal, frequential (for example a colour, a frequency, a frequency band), a phase, a decomposition according to another vectorial space base (for example a wavelet decomposition), or any dimension of any topological space.

In addition to the elementary information making it up, a digital object comprises a certain number of attributes, which may vary according to its nature. These attributes may in particular relate to the dimensions of the object and to the elementary information. It is then possible to define types of object, which each correspond to objects having a given set of attributes. Among the typical attributes of an object, the colour, geometry and definition can for example be cited. Other attributes can of course also be envisaged. Examples of types of objects and attributes are provided below.

When the digital object in question is a digital image, this can be obtained for example by means of an acquisition system, such as a photographing system.

According to non-limitative examples, the acquisition system may be a disposable photographic apparatus, a digital photographic apparatus, a reflex camera (digital or not), a scanner, a fax, an endoscope, a camera, a camcorder, a surveillance camera, a toy, a camera or photographic apparatus integrated in or connected to a telephone, a personal assistant or a computer, a thermal camera, an echographic apparatus, an MRI (magnetic resonance) imaging apparatus, or an x-ray radiography apparatus.

An image acquisition system generally comprises, apart from an optical system the role of which is to focus the light, a sensor. Such a sensor comprises mechanical, chemical or electronic means for capturing and/or recording images.

The sensor is for example a system of photosensitive cells that transforms the quantity of light received into digital values, and attributes to each pixel the value or values that correspond thereto. The raw image directly acquired by the sensor is traditionally called the RAW image. The number of digital values finally attributed to each pixel depends on the photographic system.

For various reasons, the values of the elementary items of information of a RAW image returned by the sensor are not functions completely deterministic of the quantity of light received. They contain a random part, called noise, which has no relationship to the scene observed. The noise is for example due to the particular character of the light or to thermal phenomena taking place in the electronic circuitry of the sensor.

Some of the noise is generally extremely local, and its extent may be of the order of magnitude of 1 pixel.

As a first approximation, its statistical properties are well described by two parameters:
 a distance that gives the characteristic distance that it is necessary to travel for two values of the noise to be statistically independent or the dependency of which is below a predetermined threshold. This distance can be seen as the size of the digital grain, a definition of which will be given below, and
 a value called the intensity, which describes the variation in the digital values caused by the noise. In the case of a colour image, the noise has value on each channel.

Within the meaning of the invention, a white noise or more generally a "white" object is defined as an object for which the elementary items of information at a position of the object are decorrelated from the elementary items of information of this same object in adjoining positions. The elementary values of the object are therefore statistically independent.

Within the meaning of the invention, a "quasi-white" noise or more generally a "quasi-white" object is defined as an object for which the elementary items of information at a position of the object have a correlation level, with elementary items of information of this same object at adjoining positions, lower than a threshold; this threshold being either predetermined for example according to the sensitivity of the eye to the structured noise, or determined from the autocorrelation of another object; thus this threshold may for example take the value 10%; this threshold may also take for example the value 10% of the autocorrelation level of the original object from which the quasi-white object is extracted by one of the methods according to the invention.

In the same way, an image other than a RAW image, that is to say one having already undergone a certain number of transformations, contains noise.

Before being displayed, a digital image undergoes a succession of processing operations, referred to as a processing string. The purpose of these processing operations is for example to improve the definition, to eliminate artefacts or to modify the colour.

Among these processing operations, some may have a detrimental effect on the noise contained in the image in question.

This is the case in particular with so-called neighbouring processing operations, in the sense that they transform the values of a pixel (or more generally of an object element) according to the values of adjoining pixels (or more generally adjoining object elements).

These neighbouring processing operations use the fact that close positions in a scene contain correlated information, that is to say linked to each other. This assumption makes it possible to reconstruct the missing or degraded information in the digital images.

Not only are the values in each pixel liable to be modified, but new values in each pixel may be created. The final image may therefore have a different number of channels from that of the original image. For example, when the original image is a RAW image, with a single value per pixel corresponding to a single channel, the final image, after processing, may have three values per pixel corresponding respectively to the three red, green and blue (R,G,B) channels.

One problem posed by these neighbouring processing operations is that the assumption of local correlation of the information that they make is wrong for noise, which is of a nature independent of the physical properties of the scene.

More precisely, a neighbouring processing will create correlations in the noise having as their consequence the appearance of visible structures that in no way correspond to the scene observed. In other words, a neighbouring processing structures the noise. From a mathematical point of view, neighbouring processing operations change the statistical properties of the noise, such as the autocorrelation function.

This structuring of the noise is represented visually by the appearance of a digital grain. In the case of a colour image, this grain typically appears in the form of ugly coloured spots, the size and intensity of which depend on the neighbouring processing operations. This digital grain does not in general have the charm of that of silver photography, and it is wished to be able to dispense with it.

One possible definition for the digital grain would for example be the autocorrelation of the noise that quantifies the spatial correlation of the noise with itself, taken at different spatial positions.

Another example of processing operations that may have a detrimental effect on the noise contained in a digital image concerns the processing operations tending to amplify the noise. These processing operations may cause a degradation of the image since the noise is more visible therein, sometimes to the detriment of the useful information.

One example of such processing operations is the increase in the contrast of an image. It consists schematically of making the dark pixels in an image darker and the light pixels of the image lighter. This amplification of the contrast applies in the same way to the noise contained in the processed image.

In summary, the processing operations that structure or amplify the noise create undesirable effects when they are applied to a noisy digital image.

One idea for attempting to limit these undesirable effects would be to denoise the digital image before applying to it the processing operations in question. This idea was in particular envisaged in U.S. Pat. No. 6,934,056, in a specific application. This document makes provision in fact for denoising a RAW image before applying to it the neighbouring processing known as dematrixing.

Various denoising algorithms can be used for this purpose. The purpose thereof is to modify the original image in order to derive from it, ideally, an image that would be the one that would be obtained in the absence of noise.

However, even the best current denoising methods do not make it possible to distinguish very fine textures, such as the roughness of a surface or the irregularities of a skin, and noise. The majority of these methods have the effect of reducing the intensity of the noise to the detriment of the fineness of its grain.

Because of this, the denoising of a digital image, while attenuating its noise, eliminates certain fine structures that constitute the useful information of the image. The image that results therefrom may give the impression of lacking relief and realism.

Although the example of a digital image has been examined above in particular, it should be noted that the same problem is posed in a similar fashion for the other kinds of object mentioned above.

One object of the present invention is to limit the drawbacks stated above.

In particular, one object of the invention is to limit the structuring of the noise contained in a digital object, without causing excessive loss of useful information.

SUMMARY OF THE INVENTION

The invention thus proposes a method of processing a digital object, comprising the following steps:
  denoising an original object of a first type containing noise in order to obtain a denoised object of said first type;
  obtaining a quasi-white noise object of the first type from a difference between the original object and the denoised object;
  applying to the denoised object a first processing comprising a neighbouring processing transforming the values of an object element according to the values of adjoining object elements in order to obtain a transformed object of a second type, the first processing being such that it would have the effect of structuring the noise contained in the original object if it were applied to said original object;
  applying to the noise object a second white processing in order to obtain a quasi-white transformed noise object of the second type; and
  introducing the transformed noise object into the transformed noise object.

As stated in the introduction, the first and second types of object each correspond to objects having a given set of attributes (eg colour, geometry, definition, etc).

Moreover, a quasi-white object is defined as an object for which the elementary information at a position of the object is decorrelated or quasi-decorrelated from the elementary items of information of the same object at adjoining positions.

A quasi-white object is thus opposed to a correlated object, which relates to an object for which the elementary items of information at a position of the object are correlated with the elementary information of the same object at adjoining positions.

A white processing for its part is a processing that transforms a quasi-white object into a quasi-white object.

Neighbouring processing operations for their part have already been defined in the introduction.

Thus, according to the invention, the extraction of a quasi-white noise from the original object, upstream of the implementation of the first processing, and then the preservation of its quasi-white character by virtue of the use of a second processing that is a white processing, enables it to remain quasi-white and therefore prevents its being structured (i.e. correlated).

In addition, the useful information extracted from the original object, with the noise, during denoising, is found again in the final object by reintroduction of the transformed noise object into the transformed object. This reintroduction of the noise is not a problem since the noise has not been structured. In particular, where digital images are concerned, the digital grain of the final image is of identical or similar size to that of the initial image.

In addition, this reintroduction of the noise is facilitated by the fact that the first and second processing operations used modify the type of the denoised object and of the noise object in the same way in order to obtain objects of the same type, that is to say having the same attributes in particular of colour, geometry and definition. In the absence of this measure, it might be inappropriate or even impossible to combine the transformed object and the transformed noise object. By way of example, the "simple" combination of a transformed object comprising three colour channels (eg R,G,B) with a noise object comprising a single colour channel would pose a problem. Likewise, the combination of a transformed object corrected for geometric distortion with a non-transformed noise object would pose a problem since, for example, the noise in the dark areas would not be superimposed on the dark areas of the transformed object. Likewise, the combination of a transformed object in which the fuzziness caused by the lens that was used to capture the object has been removed, with a non-transformed object, would pose a problem, since the quasi-white noise object would be more blurred and would mask from the eye the increase in definition of the transformed object.

Some or all of the aforementioned objects, namely the original object, the denoised object, the transformed object, the noise object and the transformed noise object may comprise digital images. In a variant, they may belong to any other category of objects listed in the introduction.

The second process (attenuation of the noise, modification of the colours of the noise, etc) may advantageously be chosen to limit the detrimental effects of the noise in the final object. In this way the noise that would appear in the final object is controlled. In addition, the second processing does not have any negative effects on the useful information included in the original object since it is applied to a noise that has previously been separated from this object.

The first processing applied to the denoised object may for example comprise a neighbouring processing transforming the values of an object element according to the values of adjoining object elements, which would have the effect of structuring the noise contained in the original object if it were applied to said original object. By way of examples, the first processing may comprise one or more from: a dematrixing when the original object is a RAW image, a defuzzification and a deformation of at least part of the denoised object.

According to other examples, the first processing may comprise one or more from: an addition of a simulated silver grain, a correction of lateral chromatic aberration, a sub-pixel image adjustment, a compression/decompression and a processing applied in a multi-scale fashion.

In a variant or in addition, the first processing applied to the denoised object may comprise a processing that would have the effect of amplifying the noise contained in the original object if it were applied to said original object. By way of examples, the first processing may comprise one or more from: an amplification dependent on the sensitivity of a sensor from which the original object came, an increase in contrast in at least part of the denoised object and implementation of a white balance in at least part of the denoised object.

According to other examples the first processing may include one or more from: a correction to shading, a saturation of the colours, a transformation of the colours, or a combination of images with different photographic parameters, in order for example to artificially increase the dynamic range of the sensor.

The second processing applied to the difference between the original object and the denoised object may associate with each element of the resulting noise object (for example with each pixel of the resulting noise image) at least one value dependent on one or more from: a value associated with at least one element corresponding to the difference between the original object and the denoised object, a value dependent on a value associated with at least one corresponding element of at least one object from among the original object, the denoised object and the transformed object, and a value dependent on at least one exogenous parameter.

The invention also proposes a system for the processing of a digital object arranged to implement the aforementioned method. The system comprises:
  a unit for denoising an original object of a first type containing noise for obtaining a denoised object of said first type;
  a unit for obtaining a quasi-white noise object of the first type from a difference between the original object and the denoised object;
  a unit for applying to the denoised object a first processing comprising a neighbouring processing transforming the values of an object element according to the values of adjoining object elements, to obtain a transformed object of a second type, the first processing being such that it would have the effect of structuring the noise contained in the original object if it were applied to said original object;
  a unit for applying to the noise object a second white processing for obtaining a quasi-white transformed noise object of the second type; and
  a unit for introducing the transformed noise object into the transformed object.

This system may also comprise image capture means and/or image retrieval means.

The invention also proposes a computer program product comprising code instructions adapted to implement the aforementioned method when it is loaded into and executed on computer means.

DESCRIPTION OF PREFERRED EMBODIMENTS

Figure 1:
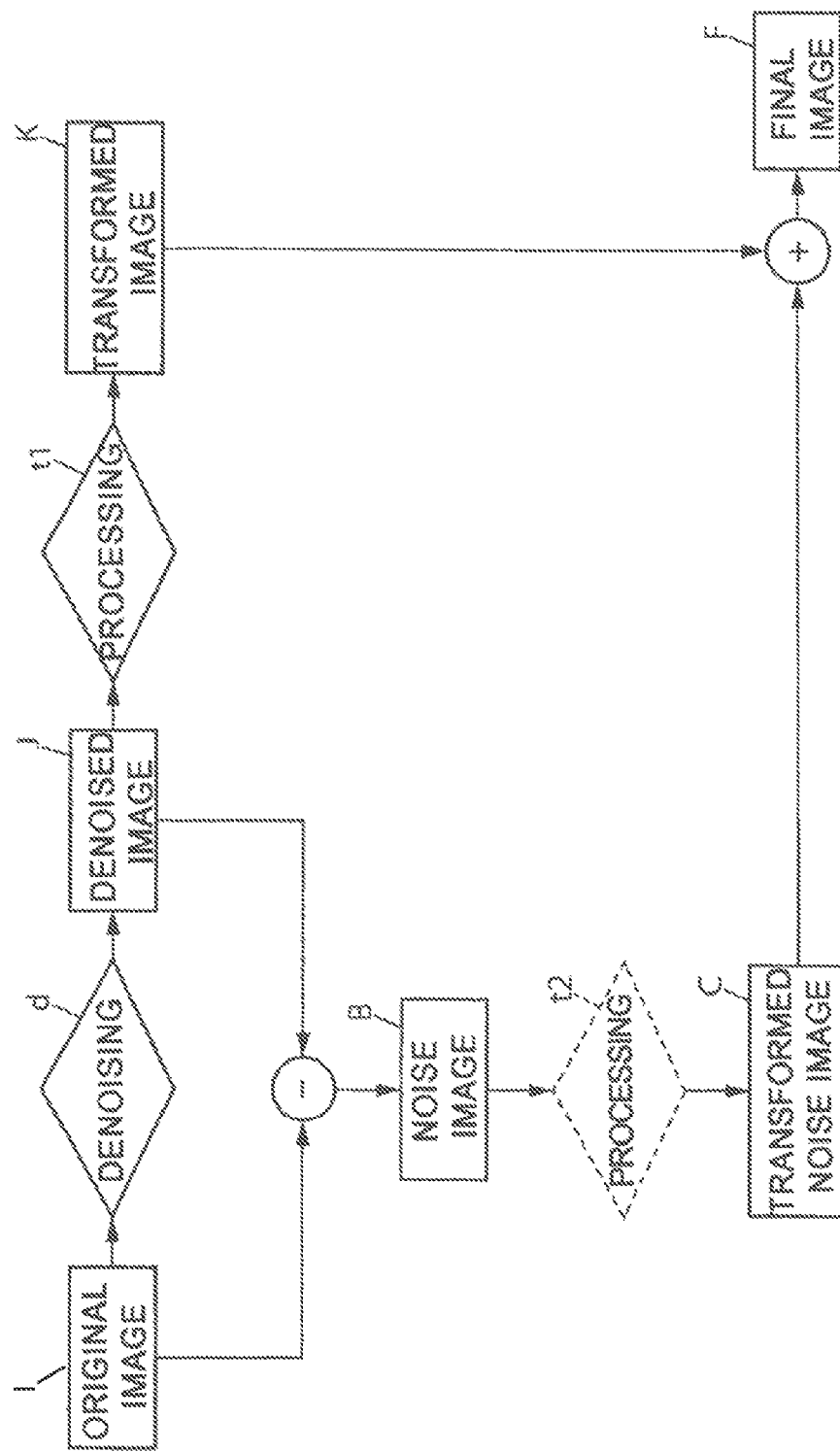
FIG. 1 is a diagram showing the main steps of a digital object processing according to the invention.

The invention will first of all be described in its generality with reference to FIG. 1. In this description, the assumption has been made that the digital objects manipulated were digital images. However, it will be understood that the invention also applies to any other kind of digital object mentioned in the introduction.

An original digital image I is available, which may be of any kind and any dimensions.

Digital image means an image in digital form. The image may come from a digital image acquisition system as mentioned in the introduction. The image may be a fixed or animated image, an image in a video sequence before photographing or an image intended to be transmitted or preserved.

The digital image may be represented by a set of digital values, called levels of grey, each digital value being associated with a colour sensitivity and a relative geometric position on a surface or volume. Colour refers to all the digital values associated with the same colour sensitivity.

The digital image may be a raw image directly issuing from the sensor (RAW image) before the dematrixing operation.

The digital image may also have undergone a processing, for example a dematrixing, a white balance, a sub-sampling or the like.

It is considered more generally that the original image I is of a first type. Because of this it comprises certain characteristic attributes of this first type of image, for example with regard to colour, geometry, definition, etc.

This original image I is denoised by means of a denoising algorithm d in order to obtain a denoised image J. The denoising algorithm d used may be any known denoising algorithm. It is however chosen so as not to modify the type of image to which it is applied. In other words, the denoised image J obtained by means of the denoising algorithm is of the first type, such as the original image I. It therefore comprises the same attributes as the original image I.

The denoising algorithm d may for example operate by defining each pixel of the denoised image J as a weighted average of the corresponding pixel of the original image I as well as it neighbours. Such an averaging in fact reduces the variance of the noise.

By way of non-limitative examples of denoising algorithms d, the sigma filter, the bilateral filter or the NL-mean can be cited.

The sigma filter effects a weighted mean in which the weights are a decreasing function of the differences in levels of grey from the pixel to be denoised. It is described in the article by J S Lee, "Digital image smoothing and the sigma filter", Computer Vision, Graphics and Image Processing 24:255-269, 1983.

In the bilateral filter, the weights used in the weighting of the mean are a decreasing function of the differences in levels of grey from the pixel to be denoised and the distance to this pixel. This denoising method is described in the article by S M Smith and J M Brady, "SUSAN—A new approach to low level image processing", International Journal of Computer Vision, 23(1):45-78, May 1997, or in the article by C Tomasi and R Manduchi, "Bilateral Filtering for Gray and Color Images", Proceedings of the 1998 IEEE International Conference on Computer Vision, Bombay, India.

As for the NL-mean, this uses a weighting of the mean in which the weights are a decreasing function of a distance between a context of the point to be denoised and its neighbour. It is described for example in the article by A Buades, B Coll and J M Morel, "A review of image denoising algorithms, with a new one", Multiscale Modelling and Simulation (SIAM interdisciplinary journal), Vol 4 (2), pp: 490-530, 2005.

A processing t1 is then applied to the denoised image J in order to obtain a transformed image K. The processing t1 is such that it would have the effect of structuring the noise contained in the original image I if it were applied to this original image I. It comprises a neighbouring processing as defined in the introduction. Examples of processing t1 will be examined subsequently.

It should be noted that the application of the processing t1 to the denoised image J rather than to the original image I aims precisely to avoid a structuring of the noise contained in the original image. The noise contained in the image J being limited by the effect of the denoising algorithm d, the transformed image K does not suffer the drawbacks stated in the introduction, in particular from the visible presence of unsightly noise structures. The transformed image K has a coarser digital grain than the original image I, but of limited amplitude.

The pixels of the transformed image K are not necessarily of the same type as those of the denoised image J. In particular, they may have a different number of channels from those of the image J.

More generally, the first processing t1 may have the effect of modifying the type of image to which it is applied. Thus the transformed image k is a second type that may differ from the first type. Because of this, the transformed image K may comprise one or more attributes distinct from those of the original image I, such as the colour and/or the geometry and/or the definition, etc.

Moreover, a quasi-white noise image is obtained from a difference between the original image I and the denoised image J. Through the operating mode of any denoising algorithm d, the noise image obtained contains, apart from the noise, useful information on the original image I of which the denoised image J was deprived. This useful information contains in particular fine structures of the original image I, such as the texture of a surface or of a skin for example.

The fact that the noise image obtained is quasi-white indicates that the elementary items of information at any position on this noise image are decorrelated from or only slightly correlated with the elementary items of information of the same image at adjoining positions. A correlation that would structure the noise at this stage is thus prevented.

Moreover, the noise image obtained is of the same type as the original image I, that is to say of the first type. It therefore comprises the same attributes as the original image I.

This noise image undergoes a processing t2. Then a transformed noise image C is obtained. The processing t2 is a white processing that therefore transforms a quasi-white object into a quasi-white object. Thus, since the noise image obtained from the difference between the original image I and the denoised image J is quasi-white, the same applies to the transformed noise image C. In this way, the noise is not structured or correlated, or only a little, and the undesirable visible effects of the noise can be limited.

In addition, the white processing t2 modifies the type of image to which it is applied in the same way as the processing t1. Thus, when it is applied to the noise image of the first type, it makes it possible to obtain a transformed noise image C of the second type. The transformed noise image C thus has the same attributes as the transformed image K.

Various examples of white processing t2 can be envisaged, some of which will be mentioned below.

Through the effect of the white processing t2, each pixel of the transformed noise image C can be associated with one or more values that depend on any of one or more from: a value associated with at least one corresponding pixel of the noise image, a value associated with at least one corresponding pixel of the original image I, a value associated with at least one corresponding pixel of the denoised image J, a value associated with at least one corresponding pixel of the transformed image K and one or more exogenous parameters.

In the case of exogenous parameters, these may be fixed by a user. In a variant, they may be independent of any user, for example when they correspond to a focal value, a lens aperture, a focussing distance, any characteristic of the camera, etc. The concept of exogenous parameter, also referred to as variable characteristic, is described in detail in the document WO 03/007239.

It should be noted that, because of the prior separation of the original image I containing the useful information and noise, implementation of the white processing t2 does not cause any degradation of the image. It is therefore possible to use white processing operations t2 that are very effective vis-á-vis noise and that would not have been able to be implemented directly on the original image I.

The transformed noise image C is then introduced into the transformed image K in order to obtain a final image F. This introduction may comprise an addition of the transformed noise image C to the transformed image K. In a variant or in addition, this introduction may comprise a multiplication of the transformed image K by the transformed noise image C.

This introduction of the transformed noise image C is made possible and easy by the fact that this image is of the same type (second type) as the transformed image K. The attributes of the transformed image C and the transformed image K being the same, combination thereof is natural and gives a coherent final image F.

In addition, the introduction of the transformed noise image C in the transformed image K makes it possible to reintroduce in the final image F the fine structures of the original image I that have erased during the denoising D. The visual effect rendered by such a final image F is therefore better and more realistic than that of the transformed image K.

The grain of this final image F is also of limited size, for example of the same order as for the original image I.

In this way a final image F is obtained, the noise of which has not been excessively structured by the processing t1, by virtue of the denoising d performed upstream, and which nevertheless contains the fine structures of the image that the denoising d had deleted.

More generally, it can be said that, in the final image F, the noise is controlled without excessive loss of useful information.

The original image I, the denoised image J and the noise image B therefore correspond to objects of the first type. The transformed image K and the transformed noise image C correspond to objects of the second type, so that the transformed noise image C can be introduced into the transformed image K in order to obtain the final image F. In one embodiment, said first type and said second type correspond to objects having at least one attribute among colour, geometry and definition, which differ from each other, and the first processing t1 and the second processing t2 have the effect of modifying said attribute relative to the denoised object J and to the noise object respectively in order to obtain objects of the second type starting from objects of the first type.

A similar result would be obtained if digital objects other than images were concerned.

Various non-limitative examples of embodiments and implementations of the invention will now be described. These may advantageously be combined with each other in any way than can be envisaged, in compliance with the general principles that have just been disclosed.

In an embodiment illustrated in FIG. 2, the original object or image, the denoised object and the noise object are Bayer RAW images corresponding to objects having as their colour attribute "Bayer raw colour" corresponding to the organisation of the elementary items of information in squares of four pixels G, R and B as described below. In a variant embodiment, the original image, the denoised image and the noise image are RAW images having other organisations of the pixels (for example panchromatic with white, red, green and blue pixels) corresponding to other types of object with other colour attributes. In a variant embodiment, the original image, the denoised image and the noise image are RGB or YUV420 or YUV422 images corresponding to other types of object with other colour attributes "RGB colour", "YUV420 colour" and "YUV422 colour". Likewise the transformed object and the transformed noise object can be of various types, and have various colour attributes, for example the attribute "RGB colour". The colour attribute can therefore for example correspond to one or more criteria relating to the colour represented by each elementary item of information.

Figure 2:
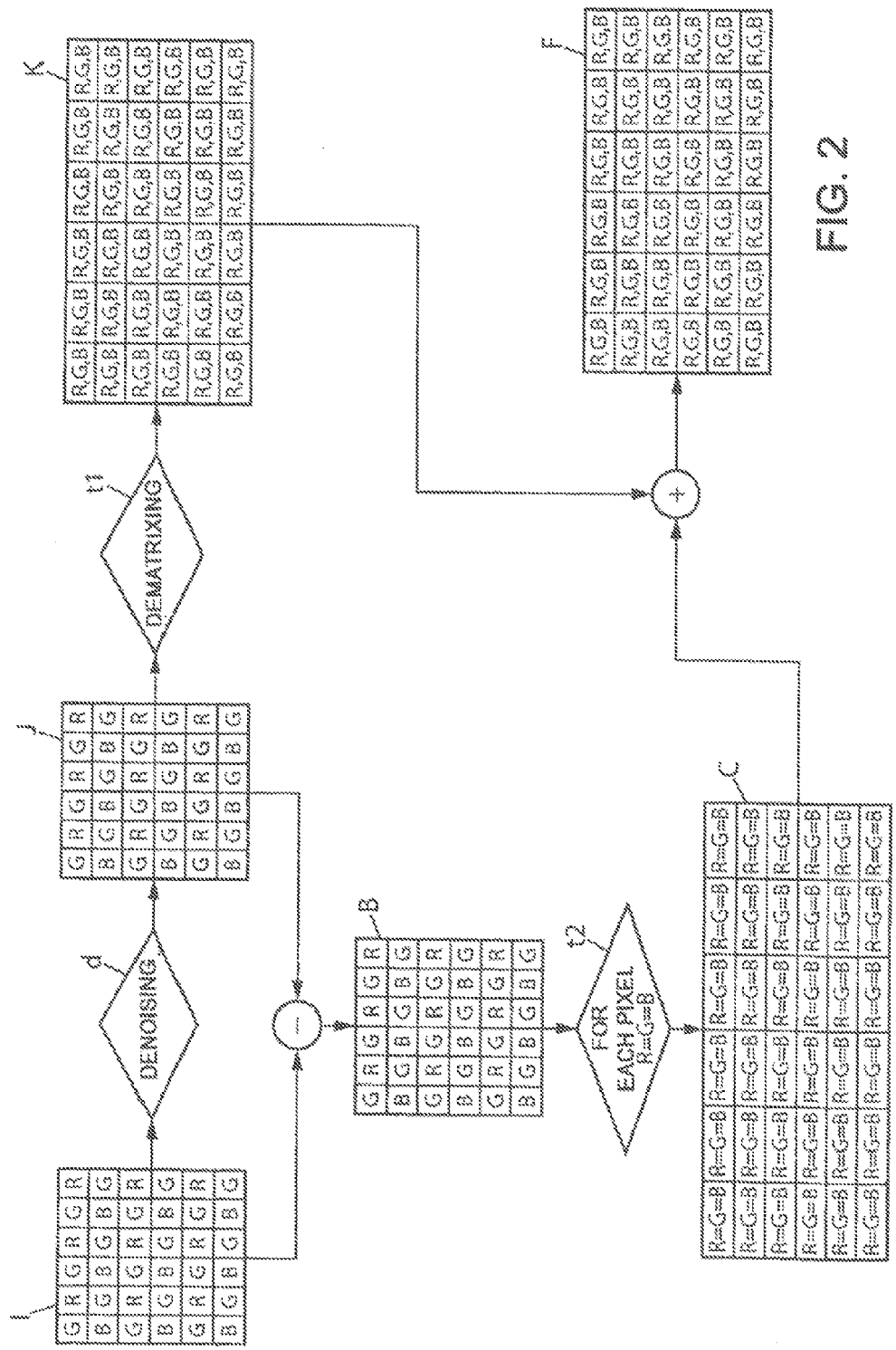
FIG. 2 is a diagram showing the steps of a digital object processing according to a particular embodiment of the invention relating to a dematrixing application.

In the example in FIG. 2 the colour attributes of the first type and of the second type are different and the first and second processing operations t1 and t2 modify the colour attribute. The colour attribute of the first type is "Bayer raw colour". The colour attribute of the second type is "RGB colour".

In the example illustrated in FIG. 2, the original image I is a RAW image issuing from a sensor provided with an array of coloured filters making it possible to measure the light only over a range of wavelengths in each pixel. For the purposes of this example the RAW image in question comes from a Bayer array in accordance with what is described in U.S. Pat. No. 3,971,065. Naturally other kinds of RAW images, such as images issuing from a monochrome sensor, a plurality of interlaced Bayer arrays, etc, could serve as the original image. This RAW image I is formed from sets of squares of four pixels, two pixels of which not having a common edge receive respective values in the green wavelength range (pixels denoted "G"), one pixel receives a value in the red wavelength range (pixel denoted "R") and the last pixel receives a value in the blue wavelength range (pixel denoted "B").

A denoising d preserving the structure of coloured filters is applied to the RAW image 1 in order to obtain a denoised image J of the same type as I (that is to say also organised in a Bayer array).

The processing t1 applied to the denoised image J is a dematrixing operation. This dematrixing makes it possible to reconstruct several values per pixel. In the example illustrated, a transformed image K is therefore obtained where each pixel is allocated a triplet of values (R,G,B) each corresponding to one of the red, green or blue channels. The pixels of the image K therefore have three times more values than the RAW image I or the denoised image J. Unlike the RAW image I, the transformed image K is thus a colour image. This transformed image K is therefore of a type different from the RAW image I, in particular with regard to the attribute relating to the colour (organisation in three planes R,G,B, rather than in a Bayer array).

Dematrixing is a neighbouring processing that would have the effect of structuring the noise if it were applied to a noisy image. This is because, in order to find for example the values corresponding to the R and B channels for a given pixel from a value corresponding to the G channel for this pixel, it makes an interpolation taking account respectively of the values corresponding to the R and B channels associated with pixels close to said pixel.

Because of the prior denoising D, this operation does not create a similar correlation in the noise contained in the original image I.

Moreover, a noise image B is defined as the difference between the RAW image I and the denoised image J. Like I and J, the image B contains one value per pixel corresponding to only one of the three channels R, G and B. The noise image B is therefore of the same type as the images I and J. It is also a quasi-white image, since no or only little correlation exists between the elementary items of information that it contains at adjoining positions.

A processing t2 is then applied to the noise image B in order to obtain a transformed noise image C. The processing t envisaged in this example for obtaining an object of the second type consists of determining, for each pixel, the values corresponding to the two missing channels. For example, these values may be taken to be equal to the known value. In other words, a pixel of the noise image B having a value corresponding to the green channel will be, in the same image C, allocated identical additional values for the red and blue channels. Thus, with each pixel of the transformed noise image C, there are associated three values R=G=B for the three channels in question in this example. The consequence of this equalisation of the channels is to make the noise grey, no colour being demarcated from the others, which makes the noise more pleasant to the eye. Naturally other white processing operations t2 are possible and in particular other values could be defined for the missing channels, with reference to the known value.

It should be noted that, in this example, the values associated with a given pixel of the noise image C depend only on the value associated with the pixel in the same position in the noise image B. In other words, the processing t2 is a white processing since it preserves the quasi-white character of the noise image B.

In addition, the transformed noise image C obtained is of the same type as the transformed image K since it is a colour image where each pixel is associated with a triplet of values (R, G, B).

Finally, the image C is introduced into the image K, these images being of the same type, that is to say having the same number of values per pixel. This makes it possible to obtain a final image F in colours. The digital grain of this image K is relatively fine and, in any event, with a size identical or close to that of the grain of the RAW image I, because the dematrixing t1 occurred after denoising d of the RAW image I. In addition, the fine structures of the RAW image attenuated or even deleted by the denoising D are found again by virtue of the reintroduction of the noise C into the final image F. In addition, the fact that the noise has been processed in order to appear grey makes it particularly discreet in the final image F.

Other non-limitative examples of processing operations t1 able to be applied to the denoised image J and able to be combined in any way that can be envisaged, in compliance with the general principles of the invention disclosed above, are given below.

The sharpness attribute corresponds for example to characterising the quantity of blur introduced by the apparatus used to capture and by the processing operations applied to obtain an image from a scene.

For example, the sharpness may correspond to the measurement of a value called BXU, which is a measurement of the blur patch surface, as described in the article published in "Proceedings of IEEE, International Conference of Image Processing, Singapore 2004" and entitled "Uniqueness of Blur Measure" by Jerome Buzzi and Frédéric Guichard.

To simplify, the blur of an optical system is measured from the image, called the "pulse response", of an infinitely small point situated in the sharpness plane. The BXU parameter is the variance of the pulse response (that is to say its mean surface).

Thus the sharpness attribute can for example be defined by a criterion to be complied with for the BXU in at least one area of the image and for at least one exogenous parameter value such as the focal length. Thus "BXU sharpness≤4 everywhere in the image" or "BXU sharpness≤2 everywhere in the image" or "BXU sharpness≤0.5 or 2≤BXU≤3 everywhere in the image" are examples of sharpness attributes. The sharpness attribute can also be defined with other criteria using for example a measurement of various optical aberrations.

In one embodiment, the original object or image, the denoised object and the noise object are RAW images corresponding to objects having as their sharpness attribute "raw sharpness of the camera C1" corresponding to a certain blur level taking account of the blur introduced by the lens and the sensor during the acquisition of the original image. It should be noted that the blur attribute may depend on exogenous parameters such as the position in the image or the focal length of the lens or the colour. In a variant embodiment, the original image, the denoised image and the noise image are RAW images having other organisations of pixels (for example panchromatic with white, red, green and blue pixels) corresponding to other types of object with other sharpness attributes. In a variant embodiment, the original image, the denoised image and the noise image are RGB or YUV420 or YUV422 or G images corresponding to other types of object with other sharpness attributes corresponding to the sharpness level having regard to the processing operations performed in order to obtain these images. Likewise the transformed object and the transformed noise object may be of various types and have various sharpness attributes, for example the attribute "raw sharpness of the camera C1 increased by 2 BxU". In practice the sharpness attribute may take account of a sharpness variable according to the position in the image or according to exogenous parameters such as the position in the image or the focal length of the lens or the colour.

Figure 3:
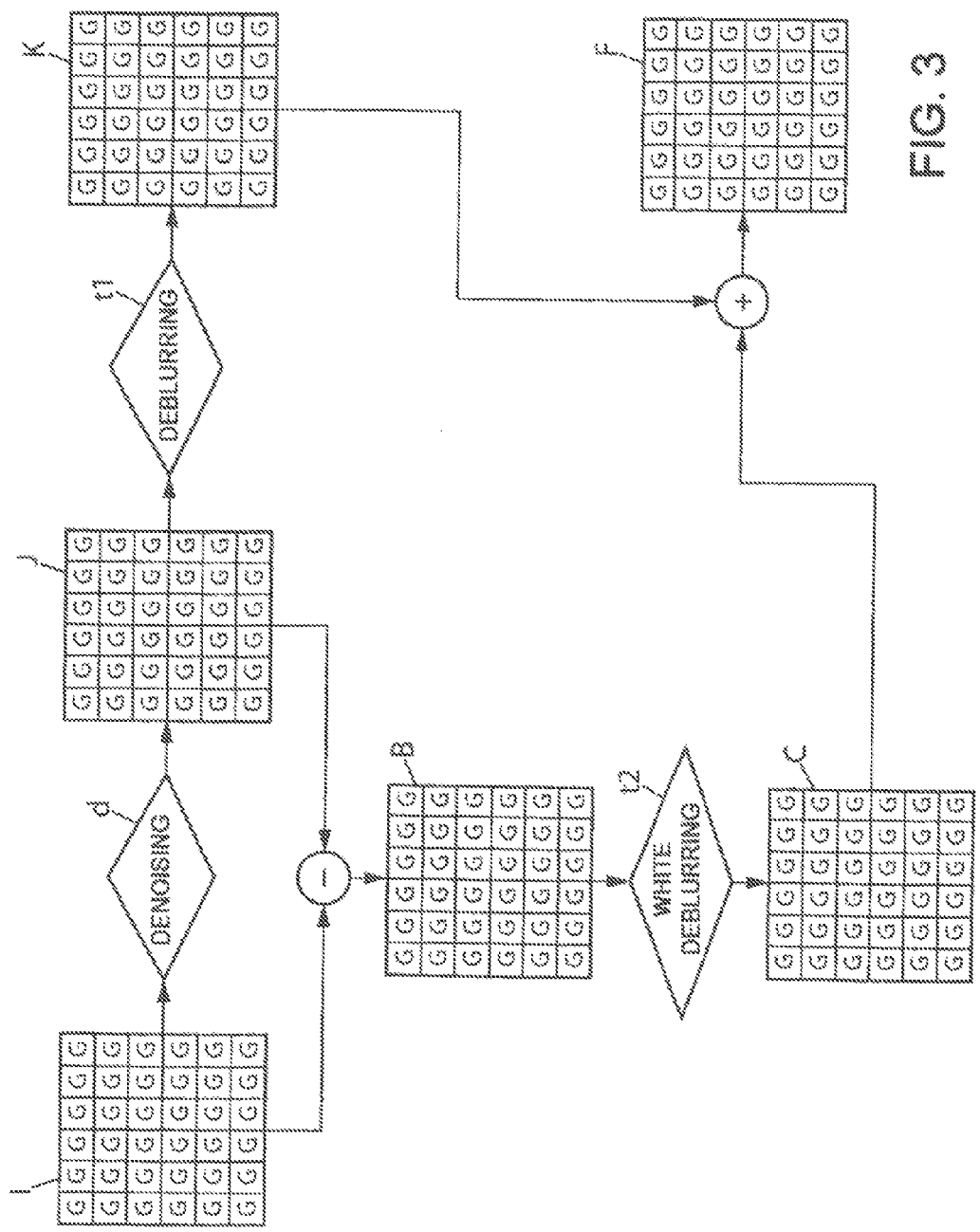
FIG. 3 is diagram showing the steps of a digital object processing according to a particular embodiment of the invention relating to a deblurring application.

FIG. 3 shows an example embodiment of the invention in which the sharpness attributes of the first type and of the second type are different and the first and second processing operations t1 and t2 modify the sharpness attribute. The first type has as its sharpness attribute "camera C1 sharpness" corresponding to the sharpness obtained by photographing the original image with the camera C1. The sharpness attribute of the second type is "BxU sharpness≤1.5". The images are images with the colour attribute "colour G" where all the pixels have the same colour G.

The processing t1 applied to at least part of the denoised image J may for example correspond to a de-blurring operation. The purpose of such an operation is to make a digital image visually sharper, using filters. Schematically, it accentuates the variations in light intensity between adjoining pixels. It is therefore a neighbouring processing that would have the effect of structuring the noise if it were applied to a noisy image since the same actuation of the variations in intensity would apply to the noise itself.

Such a de-blurring can be applied to the denoised image J whereas the original image I was an image containing a single channel or an image containing several channels. The image I may even be the result of a certain number of prior processing operations.

The geometry attribute corresponds for example to criteria to be complied with for movement with respect to a reference projection onto a plane; the movement resulting from the capture apparatus including its lens and through the processing operations applied to obtain an image from a scene. The geometry attribute can also be defined by means of criteria relating to other values.

The geometry attribute can for example be defined by a criterion to be complied with for the movement in at least one area of the image and for at least one exogenous parameter such as the focal length. Thus "geometry $d^2/60000 \leq mov \leq d^2/40000$ everywhere in the image" or "geometry $d^2/20000 \leq mov \leq d^2/100000$ everywhere in the image" are examples of geometry attributes where d represents the distance in pixels to the centre of the image and mov represents the movement with respect to the reference projection.

Figure 4:
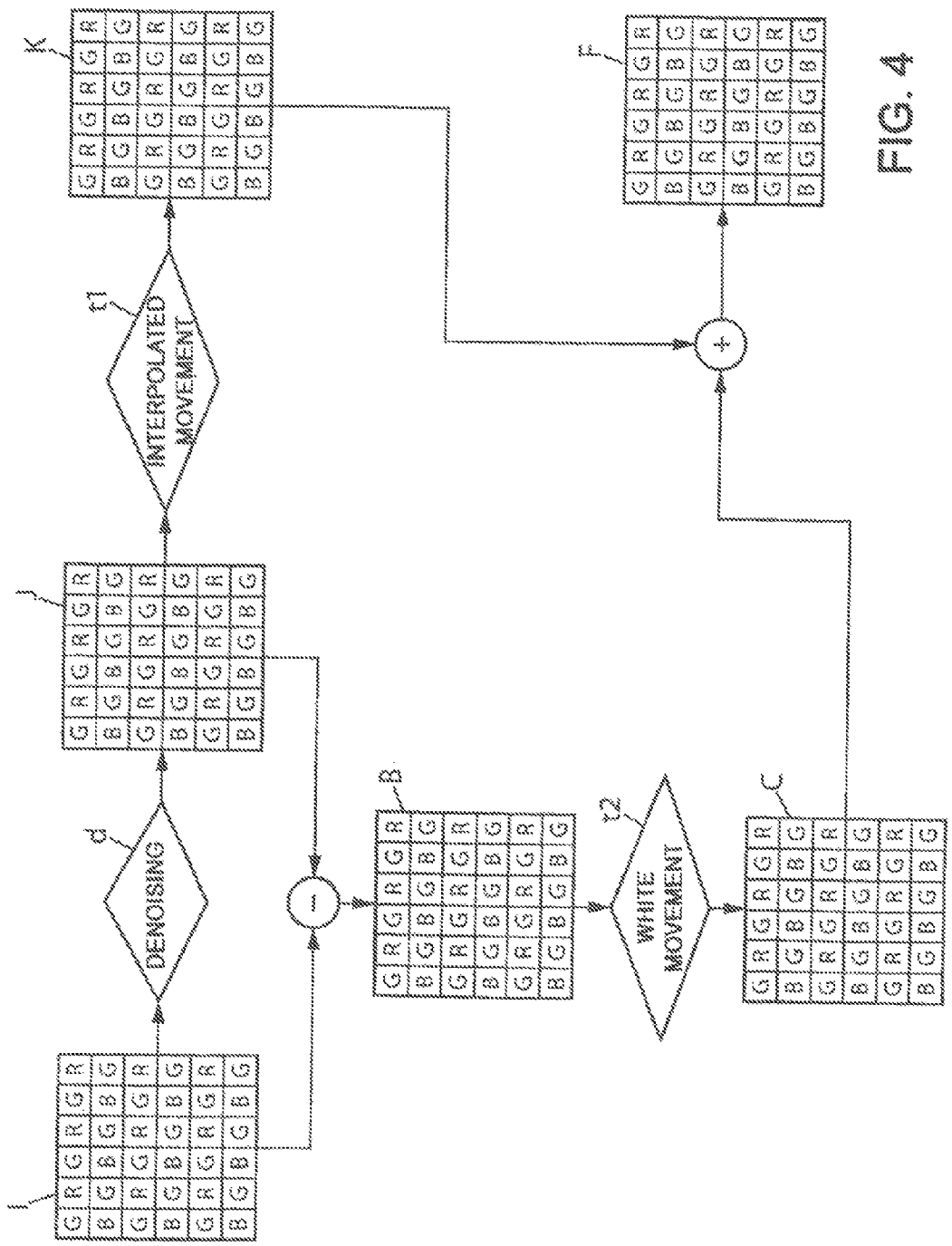
FIG. 4 is a diagram showing the steps of a digital object processing according to a particular embodiment of the invention relating to a movement application.

In an embodiment shown in FIG. 4, the original object or image, the denoised object and the noise object are Bayer RAW images corresponding to objects having as their geometry attribute "RAW Bayer camera C1 geometry" corresponding to the deformation relating to the lateral chromatic aberrations and the distortion introduced by the lens when the original image is photographed. It should be noted that the deformation may depend on the position in the image and parameters such as the focal length or the focusing. In a variant embodiment, the original image, the denoised image and the noise image are RAW images having other organisations of the pixels (for example panchromatic with white, red, green and blue pixels) corresponding to other types of object with other geometry attributes. In a variant embodiment, the original image, the denoised image and the noise image are RGB or YUV420 or YUV422 images corresponding to other types of object with other geometry attributes. Likewise the transformed object and the transformed noise object may be of various types, and have various geometry attributes, for example the "raw Bayer camera C1 geometry corrected for distortion" or "raw Bayer camera C1 geometry with a change of scale of 1.1 centred" or "raw Bayer geometry with mov<1 pixel".

FIG. 4 shows an example embodiment of the invention in which the geometry attributes of the first type and second type are different and the first and second processing operations t1 and t2 modify the geometry attribute. The first type has as its geometry attribute "camera C1 geometry" corresponding to the geometry obtained by the photographing of the original image by the camera C1. The second type has as its geometry attribute "movement≤1.0 geometry". The images are images with the colour attribute "Bayer raw colour". The processor t1 effects for example a movement by a non-integer number of pixels by sub-pixel interpolation. The processor t2 makes for example a movement by an even number of pixels or the processor t2 makes for example a movement by an integer number of pixels.

In a variant, the first processing t1 and the second processing t2 comprise the modification of several attributes, for example colour and then sharpness on at least one colour or for example geometry and then colour and then sharpness on at least one colour. This has the advantage of performing only one denoising operation and this makes it possible to carry out the processing operations t1 and t2 preferably on images having a colour attribute "Bayer raw colour", which reduces the calculation since the quantity of data is only a third of that for an image with a "RGB colour" colour attribute.

According to another example, the processing t1 comprises a deformation of at least part of the denoised image J. This deformation can for example comprise a change of scale (e.g. a zoom), a distortion correction that restores their rectilinear character to the straight lines of the image, a rotation, a parallax correction, a correction to the phenomenon of moiré (the appearance of coloured fringes in the image that occurs when there exist high spatial frequencies and which is corrected by the parameterising of anti-aliasing filters), or a correction of perspective.

Such a processing constitutes a neighbouring processing that would have the effect of structuring the noise if it were applied to a noisy image. It leads in fact to interpolating values for certain pixels that have not been affected because of a change in scale or a relative movement of the pixels of a non-integer pixel fraction.

According to another example, the processing t1 comprises a lateral chromatic aberration correction that aims to correct the phenomenon according to which not all of the wavelengths are refracted in the same way by the lens of a camera. On the edge of a colour image, it is in fact possible for the channels corresponding to each colour to be completely separate. The processing t1 can then have the principle of applying a different deformation to each of the channels of the image.

According to another example, the processing t1 comprises a sub-pixel image adjustment composing the denoised image J, which makes it necessary to interpolate intermediate values. Such a processing can be seen as a re-sampling of the denoised image J.

According to yet another example, the processing t1 applied to the denoised image J may be a multiscale processing. In this case, the denoised image J results from a sub-sampling of the original image I and can thus be seen as a set of images j at different resolutions. By way of illustration, the denoised image J could comprise two images j each including only half of the pixels, compared with the original image I. In the same way, it is possible to obtain a set of noise images c each having the same size as the corresponding image j. This example can be seen as a recursive implementation of the method described above.

According to another example, the processing t1 applied to the denoised image J may comprise a compression/decompression that would create artefacts if it were applied to the noisy original image I. If appropriate, a different compression/decompression can if necessary be applied to the noise image. In this case the attributes of the corrected image comprise a description of the impact of the compression/decompression for example on the other frequencies so that the type of corrected image and the corrected noise image are the same.

In other examples, the processing t1 applied to at least part of the denoised image J may comprise a processing that would have the effect of amplifying the noise if it were applied to a noisy image.

The processing t1 can for example comprise an amplification dependent on the sensitivity of the sensor from which the original image I came. This is because the majority of sensors have a sensitivity variable according to the wavelength. They are thus often more sensitive to red and green radiation than to blue radiation.

In the case of an original image I of the RAW type for example, the values corresponding to the blue channel can therefore undergo a stronger amplification than the values corresponding to the red and green channels.

The denoising d carried out prior to such amplification t1 therefore prevents similar amplification of the noise.

According to another example, the processing t1 can comprise an increase in the contrast of this image. As stated in the introduction, the increase in contrast consists schematically of making the dark pixels of an image darker and the light pixels of the image lighter. If it were applied to a noisy image, it would have the effect of amplifying in the same way the noise contained in the image.

It should be noted that the increase in contrast, like other processing operations envisaged, may be based on the use of one or more mono- or multi-dimensional look-up tables (LUTs). These tables store the result of the application of one or more functions with predetermined values. They limit the quantity of calculation necessary during processing.

According to yet another example, the processing t1 can comprise the use of a white balance in at least part of the denoised image J. Such an operation has the effect of making a spectrally neutral object white. Thus, whatever the nature of the original light spectrum sent onto the object, for example if it is a case of a spectrum with yellow-red dominant because of tungsten lighting, the transformed image K will show this object in white if the latter returns a spectrum of the same form as the original spectrum.

Such a white balance can for example be achieved by making identical or close to each other the values (R,G,B) of the portion of the image processed that corresponds to a spectrally neutral object. In doing this, it amplifies some of these values, for example the value corresponding to the blue channel. A similar amplification of the noise would therefore take place if the white balance were applied to a noisy image.

According to another example, the processing t1 applied to at least part of the denoised image J may comprise a correction to the shading. This processing aims to correct the non-uniformity of the lighting of the sensor, which means that the peripheral pixels generally receive less light than the pixels at the centre. To do this, it multiplies the value or values of each pixel by the inverse of the attenuation factor that is applied in this pixel.

According to another example, the processing t1 applied to at least part of the denoised image J can comprise a colour saturation or "vibrance". This processing amplifies the colours, in order to give to the image an appearance close to a postcard.

According to another example, the processing t1 applied to at least part of the denoised image J can comprise a colour transformation (e.g. into sepia).

According to another example where the denoised object J consists of the combination of a plurality of images j, the processing t1 can apply to all or some of these images j. This is the case for example when the HDR ("high dynamic range") technique is used, which makes it possible to obtain several images of the same scene, with different photographing parameters (for example the posing time, the aperture of the diaphragm, etc.), and thus to artificially increase the dynamic range, that is to say the coding capacity, of the sensors. A similar combination may moreover be necessary for finding a single noise image from a plurality of noise images resulting from the denoising of the original image I.

Some processing operations t1 can both structure and amplify the noise.

By way of example, the simulation of the grain of a film for giving the denoised image J the appearance of a silver photograph, with for example a "retro" effect, can be cited.

If the invention is applied to objects other than bidimensional digital images, processing operations t1 adapted to the nature of these objects may be used.

By way of illustration, if the original object is a series of images extracted from a film, the denoised object J may be seen as an image with two spatial dimensions and one time dimension. The processing t1 can then be a video compression that defines the image into blocks that have no existence in the scene film. The addition of the transformed noise image has a tendency to mask the block effects and to make the film much more pleasant.

For more details on the aforementioned processing operations or for other examples of processing operations that can be used, reference can be made in particular to EP02751241.7, EP02743349.9, EP02747504.5, EP02748934.3, EP02743348.1, EP02748933.5, EP02747503.7, EP02747506.0, EP02745485.9 or PCT/FR2004/050455.

In addition to the processing t1 that is applied to the denoised image J and different examples of which have been described above, a processing t2 is applied to the noise image B. An example of processing t2 has already been described with reference to FIG. 2 in the context of the dematrixing of a digital image. Other non-limitative examples that can be combined in any way that can be envisaged, with each other and/or in relation to a processing t1 applied to the denoised image J, in compliance with the general principles of the invention disclosed above, are described below.

The white processing t2, when it is used, may advantageously comprise a modification to the noise image B that preserves the size of the noise and therefore of the digital grain.

In particular, the intensity of the noise in the image B can be attenuated, without risk of attenuating in the same way the useful information in the original image I since the noise has been extracted therefrom by the action of the denoising d.

The degree of the attenuation applied to each pixel of the noise image B may depend on an exogenous parameter. This parameter may be fixed by a user. The latter can for example choose to attenuate by 10% the value or values associated with each pixel of the noise image B.

The attenuation can also vary according to the pixels of the noise image B. By way of illustration, it could be decided to apply an attenuation of the noise of 30%, 40% and 50% respectively for the pixels of the noise image B that correspond to pixels of the original image I or of the denoised image J that are in dark tones, mid-tones and light tones. In a variant, or in addition, the attenuation may vary according to the pixels of the noise image B as a function of the colours of the corresponding pixels within the original image I or the denoised image J.

In this scheme, it can be considered that a pixel of the noise image B corresponds to a pixel of the original image I or of the denoised image J if these two pixels have the same position within the image to which they belong respectively. In a variant, several pixels of the original image I or of the denoised image J could correspond to a pixel of the noise image B: for example the pixel of I or J in the same position as the pixel B, as well as its neighbours. The match between these pixels can then be made according to a position criterion. According to yet another variant, the match could be made from contexts: for example, pixels of I or J and B could correspond if they belong to the same object, if they relate to the same texture, if they have the same colour range, etc.

According to another example, the white processing t2 used may comprise a modification to the noise in order to modify the colours thereof.

Thus, if the original image I in question is a colour image from which three values (R,G,B) are available in each pixel, the noise image B, which is of the same type as I, can be modified so that in at least some of its pixels the values (R,G,B) have the same ratios of values R/G and B/G as in the corresponding pixels of the image I, J or K.

In this case also, the values associated with each pixel of the noise image C therefore depend on values associated with the corresponding pixel within the noise image B, and the image I, J or K. The match between these pixels can be defined in various ways, as indicated above.

Such a processing makes it possible to obtain a transformed noise image C that has substantially the same colours as the image I, J or K. It has thus avoided generating inappropriate colour spots within the final image F, after final reintroduction of the noise into the image K, and the visual perception of the noise thereof is reduced.

In a variant, a desaturation of the colours of the noise image B can be used. To do this, the values (R,G,B) associated with each pixel of the noise image B can be made equal or close. Such a processing thus associates with each pixel of the noise image C three values (R,G,B) that depend on at least one of the values (R,G,B) associated with the corresponding pixel of the noise image B. In this case, unlike the noise image B, the transformed noise image C is no longer in colours.

If the noise object B corresponds to a digital object other than an image, processing operations t2 adapted to the type of this object can be used.

In one embodiment, said first type and said second type correspond to objects having at least one attribute among colour, geometry and sharpness, which differ from each other, and the first processing t1 and the second processing t2 have the effect of modifying said attribute relative to the denoised object J and the noise object respectively.

In all cases, a processing t2 that is white and modifies the type of an object in the same way as the processing t1 will be chosen.

For example, if the processing t1 modifies the geometry attribute of the denoised image to which it is applied, by subjecting it to a given geometric deformation such as a distortion, a lateral chromatic aberration, a change of scale, a projection, or the like, the processing t2 chosen will modify the geometry attribute of the noise image to which it is applied, in an identical or similar fashion.

Take the example, illustrated by FIG. 4, of the modification of the geometry of a RAW digital image. The digital image I is then a RAW image, the resulting image F also a RAW image.

A processing t1 is applied to the denoised RAW image J in order to obtain a transformed RAW image K. The processing t1 consists of determining the value of each pixel K according to: a not necessarily full position in the image J (corresponding to the change in geometry) and an interpolation of the values of the pixels of the image J in the vicinity of this position. The processing t1 can for example interpolate using a bicubic interpolation of the pixel values of the image J corresponding to the colour of the processed pixel of the image K. (In the case of a RAW image of the Bayer type, each pixel contains a value only for a colour). However, the interpolation can just as advantageously involve the values of pixels corresponding to different colours. The interpretation will be chosen so as to make a modification to the geometry that best avoids the losses of information and best preserves the visual quality of the image K. More complex methods than a bicubic interpolation involving one or more colours can be chosen.

The processing t1 is such that it would have the effect of structuring the noise contained in the original image I if it were applied to this image. It comprises in fact a neighbouring processing (the interpolation) as defined in the introduction. It should be noted that the application of the processing t1 to the denoised image J rather than to the original image I aims precisely to avoid a structuring of the noise contained in the original image. Note also that the pixels of the transformed image K are not necessarily of the same type as those of the denoised image J; since the geometry of the image was modified by the processing t1.

The processing t2 will effect a modification of the geometry of the noise image B, into the image C, best preventing the structuring of the noise. For example, the processing t2 will be able to determine the value of each pixel of C according to: a not necessarily full position in the image C (corresponding to the same change of geometry as that effected by t1) and taking the value of the pixel, of the image B, closest to this position. The processing t2 thus defined is a white processing since it preserves the quasi-white character of the noise image B. It will thus be possible in a variant embodiment to choose for t2 an interpolation involving a smaller vicinity that the processing t1 and maintaining the quasi-white character of the image C.

In addition, the transformed noise image C thus obtained is of the same type as the transformed image K. The image C is then finally introduced into the image K, thus making it possible to obtain a final RAW image F with corrected geometry and having a quasi-white noise.

Such a variant of the method therefore makes it possible to modify the geometry of a RAW image while avoiding structuring its noise.

In an advantageous variant of the example in FIG. 4 applying to the RAW image of the Bayer type, the processing t2 will choose or interpolate the values of pixels of the image C from values of pixels of an image B, without taking account of the colour character of each pixel. That is to say the interpolation step will function as if the images B and C were images of one and the same channel. The processing t2 will then be able to choose or interpolate values of pixels corresponding initially to different colours. Thus, by the change of geometry, a value of the image B of a for example "blue" pixel will be able to be found on the image C on a for example "green" pixel. The advantage of this variant is to allow a movement on a resolution greater than that of each of the channels of colours of the initial RAW image. This is because the image B considered as a single channel is doubly more resolved than each of these four colour planes. Thus the processing t2 will make it possible to obtain a grain with a size less than that which would be obtained considering the four channels separately. The processing t2 can change the colour of the noise, but this is not a problem since this does not structure the noise and it will advantageously be possible to make the noise "grey" as explained previously during the dematrixing step.

Likewise if, as in the example shown in FIG. 3, the processing t1 modifies the sharpness attribute of the denoised image to which it is applied, by subjecting it for example to deblurring, the processing t2 chosen will modify the sharpness attribute of the noise image to which it is applied, in an identical or similar fashion. The processing t2 will then be able to be a simple multiplication by a scalar quantity of the noise image B. The scalar depends on the deblurring level effected by the processing t1. For example, t1 will be able to be chosen as deblurring by means of a convolution. The multiplying scalar quantity defining t2 will then be able to be defined by the root of the sum of the squares of the coefficients of the convolution (norm L2). Multiplication by a scalar quantity preserves the quasi-white character of the image B. In addition, this corresponds to a modification of the sharpness attribute having regard to the quasi-white character of the noise image B. Such a variant of the method therefore makes it possible to modify the sharpness of a digital image while avoiding structuring its noise.

In a variant, t2 is identical and the noise image B and the modified noise image C are identical. This makes it possible for example to simplify the calculations in the case where the noise image B is of the first type but also meets the criteria of the second type, in particular for the sharpness attribute.

Naturally, processing operations t1 and/or t2, other than those that were mentioned above, can be implemented in the context of the present invention, as will be clear to a person skilled in the art. These processing operations can also be adapted according to the type of digital object to which they apply respectively.

In all cases, the transformed object may be intended to be stored and/or processed and/or retrieved by an image retrieval system (eg a screen, a projector, a television set, virtual reality spectacles, a printer, etc).

The invention also proposes a system comprising units for implementing the method that has just been described. This system advantageously comprises an electronic component including software and/or hardware means for implementing the method. It may possibly comprise a sensor and/or an imager, and/or any image retrieval means.

This system may consist of a simple device. This is for example the case when all the steps described above are performed by means of embedded technology, for example within a photographic apparatus or a portable telephone possibly provided with a photographing system such as a camera capable of acquiring the original image I.

Alternatively, this system may be distributed between different devices. For example, some of the operations may be implemented within a first device, while other operations would be implemented within a second device.

Advantageously, all or some of the method may be performed by means of a computer program loaded and executed on computer means. Thus digital image processing software loaded on a computer for example may, from an original object, provide a final object according to the principles described above.

The invention claimed is:

1. Method of processing a digital object, comprising:
   denoising an original object of a first type containing noise in order to obtain a denoised object of said first type;
   obtaining a quasi-white noise object of the first type from a difference between the original object and the denoised object;
   applying to the denoised object a first processing comprising a neighbouring processing transforming the values of an object element according to the values of adjoining object elements in order to obtain a transformed object of a second type, the first processing being such that it would have the effect of structuring the noise contained in the original object if it were applied to said original object;
   applying a second white processing to the noise object in order to obtain a quasi-white transformed noise object of the second type; and
   introducing the transformed noise object into the transformed object.

2. Method according to claim 1, in which at least one among the original object, the denoised object, the transformed object, the noise object and the transformed noise object comprises a digital image.

3. Method according to claim 1 in which said first type and said second type correspond to objects having at least one attribute among colour, geometry and sharpness, which differ from each other, and in which the first processing and the second processing have the effect of modifying said attribute relative to the denoised object and to the noise object respectively.

4. Method according to claim 1, in which the original object is an image of the RAW type.

5. Method according to claim 1, in which the first processing comprises a dematrixing of the denoised object.

6. Method according to claim 1, in which the first processing comprises a deblurring of at least part of the denoised object.

7. Method according to claim 1, in which the first processing comprises a deformation of at least part of the denoised object.

8. Method according to claim 1, in which the second processing associates with each element of the noise object at least one value dependent on a value associated with at least one element corresponding to the difference between the original object and the denoised object.

9. Method according to claim 8, in which there is associated with each element of the difference between the original object and the denoised object a first value relating to a channel among a plurality of channels, and in which the second processing associates with each element of the noise object, in addition to said first value associated with the corresponding elements within the difference between the original object and the denoised object, at least a second value relating respectively to another channel of said plurality, the second value being determined with reference to said first value.

10. Method according to claim 1, in which the second processing associates with each element of the noise object at least one value dependent on a value associated with at least one corresponding element of at least one object among the original object, the denoised object and the transformed object.

11. Method according to claim 1, in which the second processing associates with each element of the noise object at least one value dependent on at least one exogenous parameter.

12. System for processing a digital object, the system comprising:
   a unit for denoising an original object of a first type containing noise in order to obtain a denoised object of said first type;
   a unit for obtaining a quasi-white noise object of the first type from a difference between the original object and the denoised object;
   a unit for applying to the denoised object a first processing comprising a neighbouring processing transforming the values of an object element according to the values of adjoining object elements in order to obtain a transformed object of a second type, the first processing being such that it would have the effect of structuring the noise contained in the original object if it were applied to said original object;
   a unit for applying to the noise object a second white processing in order to obtain a quasi-white transformed noise object of the second type; and
   a unit for introducing the transformed noise object into the transformed object.

13. System according to claim 12, also comprising image capture means and/or image retrieval means.

14. A non-transitory computer-readable storage medium with an executable program stored thereon, wherein the program instructs a processor to perform operations comprising:
   denoising an original object of a first type containing noise in order to obtain a denoised object of said first type;
   obtaining a quasi-white noise object of the first type from a difference between the original object and the denoised object;
   applying to the denoised object a first processing comprising a neighbouring processing transforming the values of an object element according to the values of adjoining object elements in order to obtain a transformed object of a second type, the first processing being such that it would have the effect of structuring the noise contained in the original object if it were applied to said original object;
   applying to the noise object a second white processing in order to obtain a quasi-white transformed noise object of the second type; and
   introducing the transformed noise object into the transformed object.

* * * * *